(12) United States Patent
Kirchmayr

(10) Patent No.: US 11,945,666 B2
(45) Date of Patent: Apr. 2, 2024

(54) MANUFACTURING DEVICE AND CONVEYOR MEANS

(71) Applicant: TRUMPF Maschinen Austria GmbH & Co. KG., Pasching (AT)

(72) Inventor: Gerhard Kirchmayr, Leonding (AT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 309 days.

(21) Appl. No.: 17/598,464

(22) PCT Filed: Apr. 10, 2020

(86) PCT No.: PCT/AT2020/060144
§ 371 (c)(1),
(2) Date: Sep. 27, 2021

(87) PCT Pub. No.: WO2020/206478
PCT Pub. Date: Oct. 15, 2020

(65) Prior Publication Data
US 2022/0185601 A1    Jun. 16, 2022

(30) Foreign Application Priority Data
Apr. 11, 2019 (AT) .............................. A 50330/2019

(51) Int. Cl.
B65G 65/00 (2006.01)
(52) U.S. Cl.
CPC .... B65G 65/005 (2013.01); *B65G 2203/0208* (2013.01); *B65G 2203/044* (2013.01); *B65G 2207/40* (2013.01)

(58) Field of Classification Search
CPC .......... B65G 65/005; B65G 2203/0208; B65G 2203/044; B65G 2207/40; B65G 65/00;
(Continued)

(56) References Cited

U.S. PATENT DOCUMENTS

| | | |
|---|---|---|
| 4,855,717 A | 8/1989 | Hafner |
| 8,342,086 B2 | 1/2013 | Resch et al. |

(Continued)

FOREIGN PATENT DOCUMENTS

| | | |
|---|---|---|
| CN | 101719313 A | 6/2010 |
| CN | 101835601 A | 9/2010 |

(Continued)

OTHER PUBLICATIONS

International Search Report in PCT/AT2020/060144, dated Jul. 24, 2020.

*Primary Examiner* — Gene O Crawford
*Assistant Examiner* — Abby A Jorgensen
(74) *Attorney, Agent, or Firm* — Collard & Roe, P.C.

(57) ABSTRACT

A manufacturing device has a manufacturing cell for processing workpieces, with a laterally circumferential safety partition, in which a lock is formed for performing a loading operation of the workpieces, wherein a first light barrier arrangement is formed at the lock, and with a driverless conveyor with a load receiver for conveying the workpieces. For performing the loading operation, a second light barrier arrangement and a third light barrier arrangement are formed between the conveyor and the lock, so that the load receiver and the workpieces are laterally bounded on opposite sides by the second light barrier arrangement and by the third light barrier arrangement.

11 Claims, 6 Drawing Sheets

(58) Field of Classification Search
CPC ........... B65G 35/00; Y02P 90/02; G01V 8/20; G05B 19/41895

See application file for complete search history.

(56) References Cited

U.S. PATENT DOCUMENTS

| | | |
|---|---|---|
| 8,886,390 B2 | 11/2014 | Wolfe et al. |
| 9,827,683 B1 | 11/2017 | Hance et al. |
| 9,926,148 B2 | 3/2018 | Hochstein et al. |
| 11,048,240 B2 | 6/2021 | Zimmermann et al. |
| 2006/0068624 A1 | 3/2006 | Boeckel et al. |
| 2013/0085625 A1 | 4/2013 | Wolfe et al. |
| 2018/0043547 A1 | 2/2018 | Hance et al. |
| 2019/0010901 A1 | 1/2019 | Murphy et al. |
| 2019/0101901 A1* | 4/2019 | Zimmermann .... G05B 19/4185 |
| 2020/0050155 A1* | 2/2020 | Ueba ........................ G05B 1/04 |

FOREIGN PATENT DOCUMENTS

| | | | | |
|---|---|---|---|---|
| CN | 204162057 U | | 2/2015 | |
| DE | 200 10 705 U1 | | 2/2001 | |
| DE | 10005841 A1 | | 8/2001 | |
| DE | 102016107564 A1 | * | 10/2017 | ....... G05B 19/41815 |
| EP | 1 447 354 A1 | | 8/2004 | |
| ES | 2749431 T3 | * | 3/2020 | ............. B60Q 9/002 |
| JP | S63-244117 A | | 10/1988 | |
| JP | 08161047 A | * | 6/1996 | |
| JP | H08-161047 A | | 6/1996 | |
| JP | S63244117 A | * | 10/1998 | |
| JP | 11024750 A | * | 1/1999 | ........... B23Q 7/1436 |
| JP | H11-24750 A | | 1/1999 | |
| JP | H1124750 A | * | 1/1999 | |
| JP | 2000-132233 A | | 5/2000 | |
| JP | 2000132233 A | * | 5/2000 | |
| JP | 2017138692 A | * | 8/2017 | ......... B60K 31/0058 |
| WO | 2015/200450 A1 | | 12/2015 | |
| WO | 2017/182486 A1 | | 10/2017 | |
| WO | WO-2017182486 A1 | * | 10/2017 | ....... G05B 19/41815 |

* cited by examiner

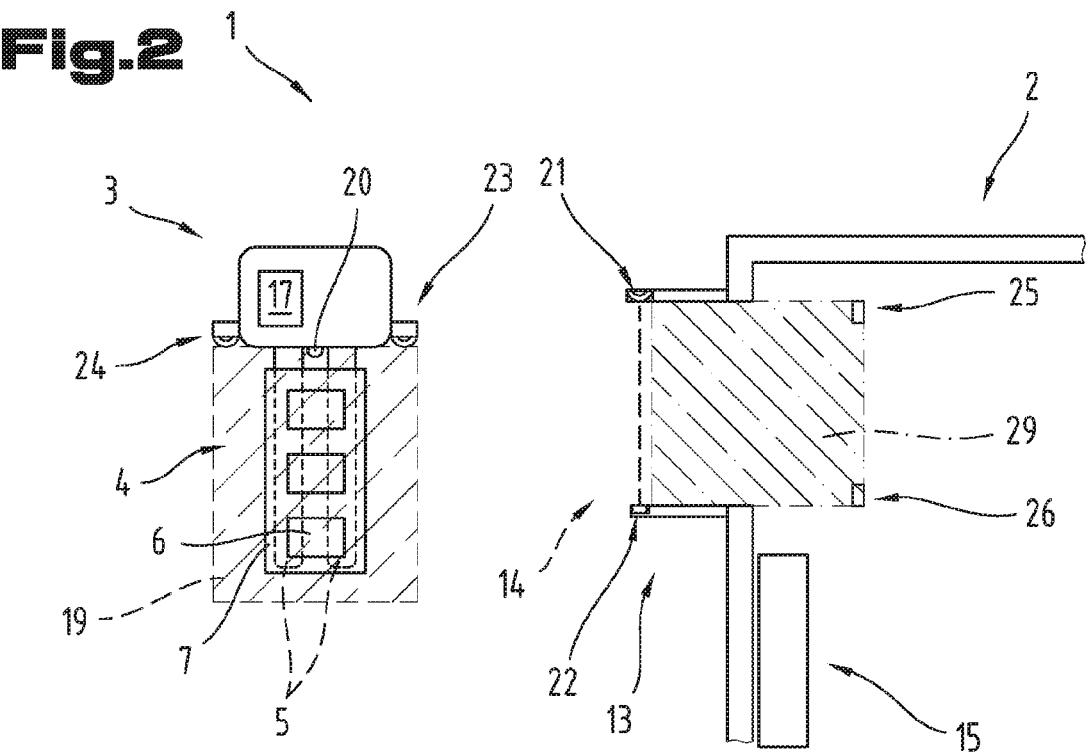
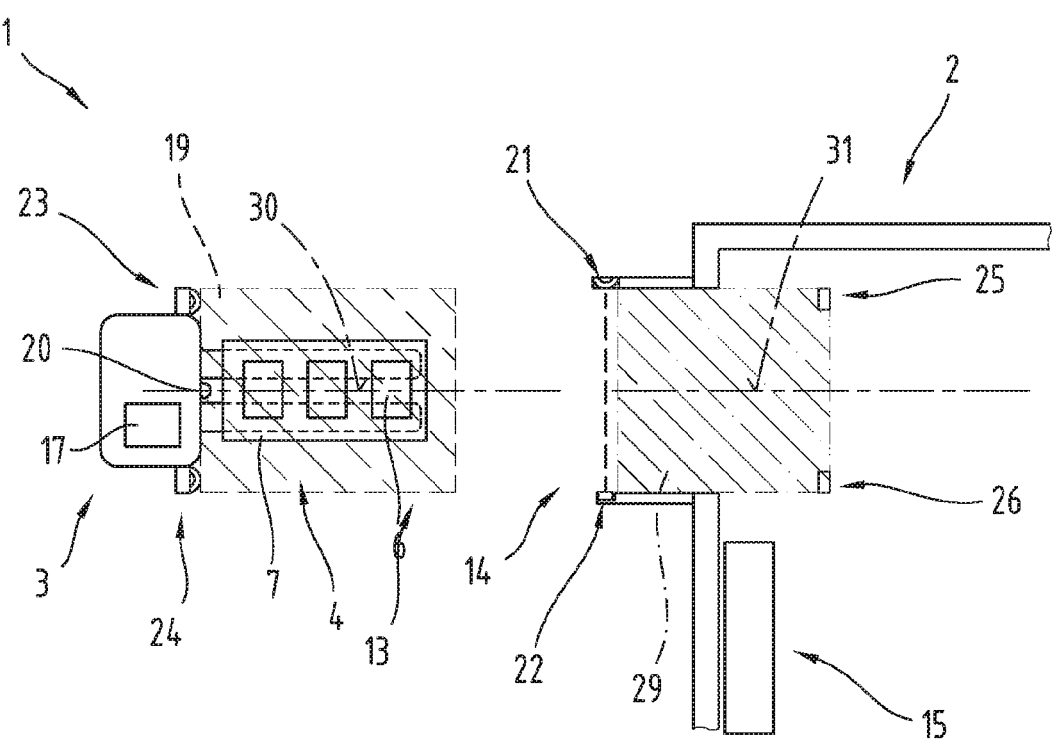

MANUFACTURING DEVICE AND CONVEYOR MEANS

CROSS REFERENCE TO RELATED APPLICATIONS

This application is the National Stage of PCT/AT2020/060144 filed on Apr. 10, 2020, which claims priority under 35 U.S.C. § 119 of Austrian Application No. A50330/2019 filed on Apr. 11, 2019, the disclosure of which is incorporated by reference. The international application under PCT article 21(2) was not published in English.

BACKGROUND OF THE INVENTION

1. Field of the Invention

The invention relates to a manufacturing device with a manufacturing cell for processing workpieces and a driverless transport vehicle for conveying the workpieces and for loading the manufacturing cell with the workpieces to be processed and a method.

2. Description of the Related Art

Apart from the processing of workpieces in industrial production plants by means of manufacturing machines operating in an automated manner and their operation by industrial robots, it is also often common to carry out the partial provisioning of the workpieces and their outward transport by means of so-called driverless transport systems (German: fahrerlose Transportsysteme, or FTS). These are in-plant, floor conveyor systems with automatically controlled vehicles, the primary purpose of which is the transport of material. In this regard, such a driverless transport system comprises one or multiple driverless transport vehicles (or automated guided vehicles: AGV), a coordinating control, devices for determining the location and detecting the position, for data transfer as well as infrastructure and peripheral devices. Floor-bound conveying means having a travel drive, which are automatically controlled and guided in a contactless manner, are provided as driverless transport vehicles. With AGV like this, the transport of material may take place by pulling or carrying conveyed goods using active or passive load receiving means. The driverless transport vehicles may be designed similarly to a pallet jack or a forklift, for example. To ensure the safety of the workers, the AGV must also be equipped with person recognition systems. Apart from that, the manufacturing cells of such production plants are secured by safety partitions, for example by means of a safety fence. Such a safety partition, which forms a boundary of the manufacturing cell, prevents persons in the vicinity from being injured by operating processing machines and/or by robots. Operators, however, may still be exposed to a hazard even outside the manufacturing cell. Such hazardous situations may occur, particularly if material is delivered to the manufacturing cell by a driverless transport vehicle or if processed parts are transported away and, for this purpose, workpieces are supplied through a lock in the safety fence and parked or are collected and moved away from there. If an operator is in the vicinity and/or in front of the lock in the safety partition of the manufacturing cell when the driverless transport vehicle with its load receiving means is approaching the lock, the operator could become stuck and get injured. At least the orderly and safe operation of the plant could be disturbed in such a situation.

SUMMARY OF THE INVENTION

Document WO 2017/182486 describes a manufacturing station with a conveying means for transporting workpieces and a manufacturing cell with a safety partition, wherein the safety partition has a lock. The workpieces are passed through said lock into the manufacturing cell by means of driverless transport vehicles. At the openings—at the beginning and the end, respectively—of the lock, light barrier arrangements are formed, by means of which the passage of the conveying means through the two openings of the lock is observed. At each one of the openings, a transmitter is arranged on one side and a receiver of the light barrier is arranged on the opposite side.

Document DE 100 05 841 A1 describes a safety device for loading and unloading trucks at dock levelers. In this regard, a predefined space is observed using light grids or similar sensors. Depending on the respective relative situation of the vehicle upon entering and/or leaving with respect to the region of the dock leveler, light grids are selectively switched on and/or off again.

In document WO2015200450, a securing device for truck loading docks is described. In this regard, the loading dock is sensed by means of suitable sensors (e.g. laser, ultrasonic), and the presence of a person in the critical region is detected.

The object of the invention therefore is to create a manufacturing device, by means of which personal safety can be ensured more reliably, and in which errors in the manufacturing process taking place in the manufacturing cell, which may be caused by the automated delivery of workpieces and their outward transport, can be avoided as much as possible.

This object is achieved by a manufacturing device with a manufacturing cell for processing workpieces, having a laterally circumferential safety partition forming a boundary of the manufacturing cell, wherein a lock is formed in the safety partition for performing a loading operation of the workpieces. In this regard, a first light barrier arrangement with a first transmitter and with a first receiver assigned to the first transmitter is formed at an opening of the lock, and a driverless conveying means with a load receiving means for conveying the workpieces is provided. For performing the loading operation, a second light barrier arrangement and a third light barrier arrangement are formed between the conveying means and the lock, so that the load receiving means and the workpieces are laterally bounded on opposite sides by the second light barrier arrangement and by the third light barrier arrangement. This design of the manufacturing device has the advantage that it enables the construction of a temporarily usable safety device.

It is also advantageous that during the execution of the loading operation, a region connected to a parking zone of the lock for the workpieces is laterally bounded by the conveying means, by the second light barrier arrangement and by the third light barrier arrangement, as thereby, the safety zone of the manufacturing cell and the safety zone of the conveying means can be connected to form a single, continuous safety zone and be observed during the course of the transfer of workpieces into the manufacturing cell or out of it.

According to an advancement, it is provided that the conveying means comprises a controller, wherein the controller is designed to activate and to deactivate the second light barrier arrangement and/or the third light barrier arrangement as needed in a program-controlled manner. This has the advantage that components of the lock, which are required for performing a loading operation, may remain inactive until a conveying means arrives at the lock and starts a loading operation.

Advantageously, the lock comprises a controller, wherein the controller is designed to activate and to deactivate the first lock in front of the lock as needed in a program-controlled manner.

The advancement of the manufacturing device, according to which the controller of the conveying means and the controller of the lock are designed to jointly observe the second light barrier arrangement and the third light barrier arrangement in a program-controlled manner, entails the advantage that the process of the loading operation can be organized and carried out locally, meaning independently of the superordinate controller of the manufacturing cell as well as independently of the central controller of the entire manufacturing device.

According to an advantageous design, it is provided that the second light barrier arrangement comprises a second transmitter, which is fastened to the conveying means, and a second receiver, which is fastened to the lock, and that the third light barrier arrangement comprises a third transmitter, which is fastened to the lock, and a third receiver, which is fastened to the conveying means.

In an advancement, the manufacturing device is designed such that the second light barrier arrangement is designed to transmit a message from the controller of the conveying means to the controller of the lock, and that the third light barrier arrangement is designed to transmit a message from the controller of the lock to the controller of the conveying means. This has the advantage that it enables direct communication between the conveying means and the lock of the manufacturing cell without an exchange of messages with the superordinate controller of the manufacturing cell or with the central controller of the entire manufacturing device having to take place for this purpose.

A design of the manufacturing device, according to which the conveying means comprises a detector for forming an observation region, wherein the observation region extends beyond a joint spatial extension of the load receiving means and the workpieces in the lateral direction, is also advantageous. This allows avoiding collisions of the conveying means both while it is moving around the premises and during the loading operation.

The object of the invention is independently also achieved by a method for loading workpieces with a driverless conveying means and a manufacturing cell for processing the workpieces, wherein, in a laterally circumferential safety partition of the manufacturing cell, a lock is formed, and wherein an opening of the lock is secured against unauthorized access by means of a first light barrier arrangement with a first transmitter and with a first receiver assigned to the first transmitter, and wherein the driverless conveying means comprises a load receiving means is controlled by a controller. In the method, the following method steps are carried out. The driverless conveying means is moved to a starting position for the loading operation, in front of the lock of the manufacturing cell, and a second light barrier arrangement and a third light barrier arrangement are activated by the controller of the conveying means, wherein the load receiving means and the workpieces are laterally bounded on opposite sides by the second light barrier arrangement and by the third light barrier arrangement, and the first light barrier arrangement is deactivated by a conveying means of the lock, and the second light barrier arrangement and the third light barrier arrangement are observed by the controller of the conveying means and by the controller of the lock during the execution of the loading operation. This helps achieve the advantage that the switch from the observation of the conveying means and the observation of the lock—independently of one another—to an observation of the joint spatial region of conveying means and lock can take place in an automated manner.

In an advantageous advancement of the method, it is provided that, if the controller of the conveying means registers an interruption of the second light barrier arrangement or the third light barrier arrangement, the conveying means is stopped. This allows preventing collisions and thus damage to parts but especially injuries to operators in the vicinity.

It is also advantageous that, if the controller of the conveying means registers an interruption of the second light barrier arrangement or the third light barrier arrangement, a detector of the conveying means is activated, wherein the detector forms an observation region extending beyond a joint spatial extension of the load receiving means and the workpieces in the lateral direction. This allows an automated check of the observation region with regard to the presence of an obstructive object or a person and thus also an automatic continuation of a previously interrupted loading operation once the obstacle has been removed.

The advancement, according to which the first light barrier arrangement is activated if the controller of the lock registers an interruption of the second light barrier arrangement or the third light barrier arrangement, has the advantage that, in case of a failure, it can additionally be observed whether an obstructive object possibly also enters into the lock and/or into the parking zone.

In an advantageous manner, the second light barrier arrangement and/or the third light barrier arrangement will be used in this method by the controller of the conveying means and by the controller of the lock for directly transmitting messages between the conveying means and the lock. Thus, the entire communication and/or the entire exchange of data and information between a conveying means and the lock can take place independently of the superordinate controllers.

BRIEF DESCRIPTION OF THE DRAWINGS

For the purpose of better understanding of the invention, it will be elucidated in more detail by means of the figures below.

These show in a respectively very simplified schematic representation:

FIG. 2 a detail of the manufacturing device according to FIG. 1;

FIG. 3 the conveying means in a starting position in front of the lock of the manufacturing cell for performing the loading operation;

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
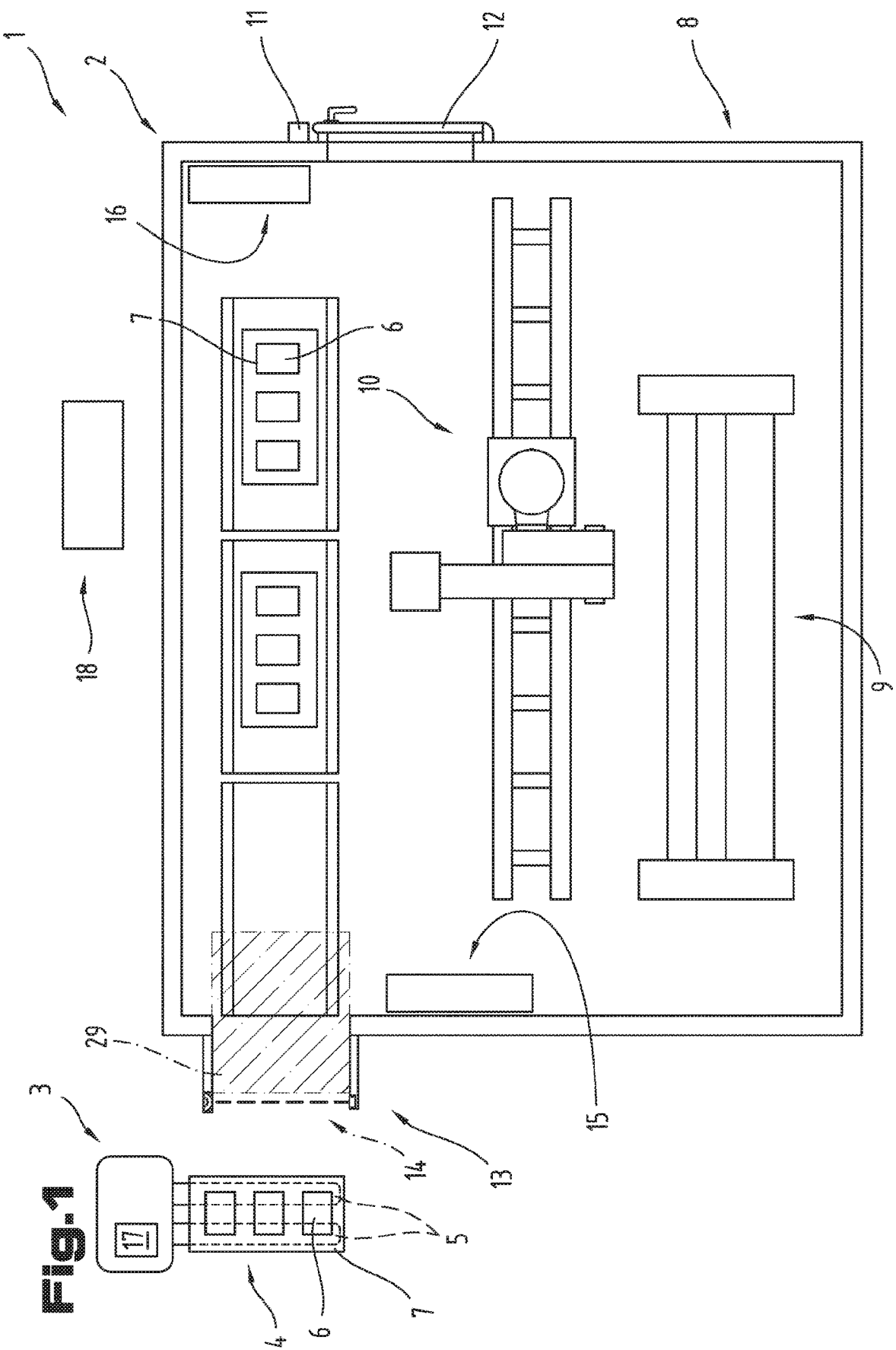
FIG. 1 a manufacturing device with a manufacturing cell and a conveying means.

FIG. 1 shows a manufacturing device 1 with a manufacturing cell 2 and a conveying means 3.

The manufacturing device 1 is shown in a top view in FIG. 1. A so-called floor-bound driverless transport vehicle (or automated guided vehicle: AGV) having its own travel drive (not shown) and thus being able to be automatically controlled and guided in a contactless manner is provided as a conveying means 3. For the transport of material, the conveying means 3 is formed having a load receiving means 4. According to this exemplary embodiment, the load receiving means 4 is designed in the form of a pallet jack with two tines and/or forks 5. With the aid of the forks 5, the load receiving means 4 can pick up and transport pallets 7 loaded with workpieces 6. The manufacturing cell 2 has a safety partition 8 in the form of a laterally circumferential boundary. According to this exemplary embodiment, the safety partition 8 is formed by a safety fence. The manufacturing cell 2 contains a processing device 9 for the automated processing of the workpieces 6. For this purpose, a handling device 10, for example formed by a multi-axis robot, by means of which the workpieces 6 are supplied to the processing device 9 and/or are removed therefrom after being processed. The processing device 9 may for example be formed by a bending press.

In the laterally circumferential safety partition 8, a door 12 equipped with a safety device 11 is provided. By this door 12, it is achieved that only operators cleared and authorized therefor may enter the manufacturing cell 2. Apart from that, the safety partition 8 of the manufacturing cell 2 has a door and/or a lock 13, which serves the workpiece transfer into the manufacturing cell 2 and/or out of it. The lock 13 also has a safety device, by means of which unauthorized access to the manufacturing cell 2 is to be prevented. According to this exemplary embodiment, a light barrier arrangement 14 is provided as the safety device of the lock 13. The light barrier arrangement 14 of the lock 13 for its part is connected to a controller 15, by means of which its operating states can be observed and controlled. The controller 15 of the lock 13 is furthermore connected to a controller 16 of the manufacturing cell 2. In the case that a person or some object enters into the observation region of the light barrier arrangement 14 or crosses the same, the controller 15 of the lock 13 detects this and communicates it to the controller 16 of the manufacturing cell 2. The controller 16 of the manufacturing cell 2 can subsequently interrupt the operation of the processing device 9 and the handling device 10 and/or initiate other safety measures as appropriate.

The conveying means 3 also has an independent controller 17, which enables the program-controlled, automatic operation of the conveying means 3. This includes controlling the travel movements, lifting, and placing down the pallets 7 with the workpieces 6, determining the location and navigation on the premises as well as the communication with a central controller 18 of the manufacturing device 1. Hence, an exchange of information and/or data may occur as it is required for the conveying means 3 to carry out the transport orders. With the aid of the controller 17 of the conveying means 3, it can also directly observe the path to be driven on while moving around the premises.

FIG. 2 shows a detail of the manufacturing device 1 according to FIG. 1. As can be seen better in the arrangement of parts of the manufacturing device 1 shown enlarged in FIG. 2, the conveying means 3 has a safety field and/or an observation region 19. This observation region 19 is realized by a detector 20 built into the conveying means 3. The detector 20 may, for example, be realized by a so-called laser scanner, with the aid of which objects in the safety field may be detected. In this regard, the detector 20 of the conveying means 3 is arranged such that its observation region 19 extends beyond the spatial extension of the forks 5 as well as the pallet 7 with the workpieces 6 in the lateral direction. The observation region 19, like the detector 20 determining the same, remains unchanged in its relative arrangement with respect to the conveying means 3. If, while moving, the conveying means 3 gets too close to an obstructive object and if said object is recognized by the detector 20 as being situated in the observation region 19, the controller 17 of the conveying means 3 may cause the stopping or an evasion maneuver of the conveying means 3, so that a collision with the obstructive object or with a person can be avoided. Consequently, material, or personal damage may also be avoided thereby.

The scanner and/or detector 20 for creating the observation region 19 moving along with the conveying means 3, may additionally also be changeable in its spatial extension. For example, the observation region 19 may be enlarged when selecting a higher travel speed of the conveying means 3 in order to thus ensure a greater safety distance.

FIGS. 3 to 7 show different sections and/or phases of the method for delivering workpieces 6 to the manufacturing cell 2 by means of the conveying means 3. The situation shown in FIG. 2 and/or the corresponding operating state of the manufacturing device 1 corresponds to the arrival of the conveying means 3 at the lock 13 of the manufacturing cell 2. Prior to the situation shown, the controller 17 of the conveying means 3 has received a corresponding transport order from the controller 18 of the manufacturing device 1 regarding the delivery of workpieces 6 to the manufacturing cell 2. In the situation shown, the access to the lock 13, however, is still closed by the light barrier arrangement 14.

This light barrier arrangement 14 in front of the lock 13 comprises a first transmitter 21 and a first receiver 22 as is per se known. Each of them is arranged on opposite sides of the door and/or the lock 13. The transmitter 21 and the receiver 22 of the light barrier arrangement 14 are moreover oriented towards one another such that a light beam generated by the transmitter 21 can be formed and/or maintained between the transmitter 21 and the receiver 22. By the transmitter 21 and the receiver 22 being connected to the controller 15 of the lock 13, an interruption of the light barriers 14 can be detected by the controller 15.

Figure 4:
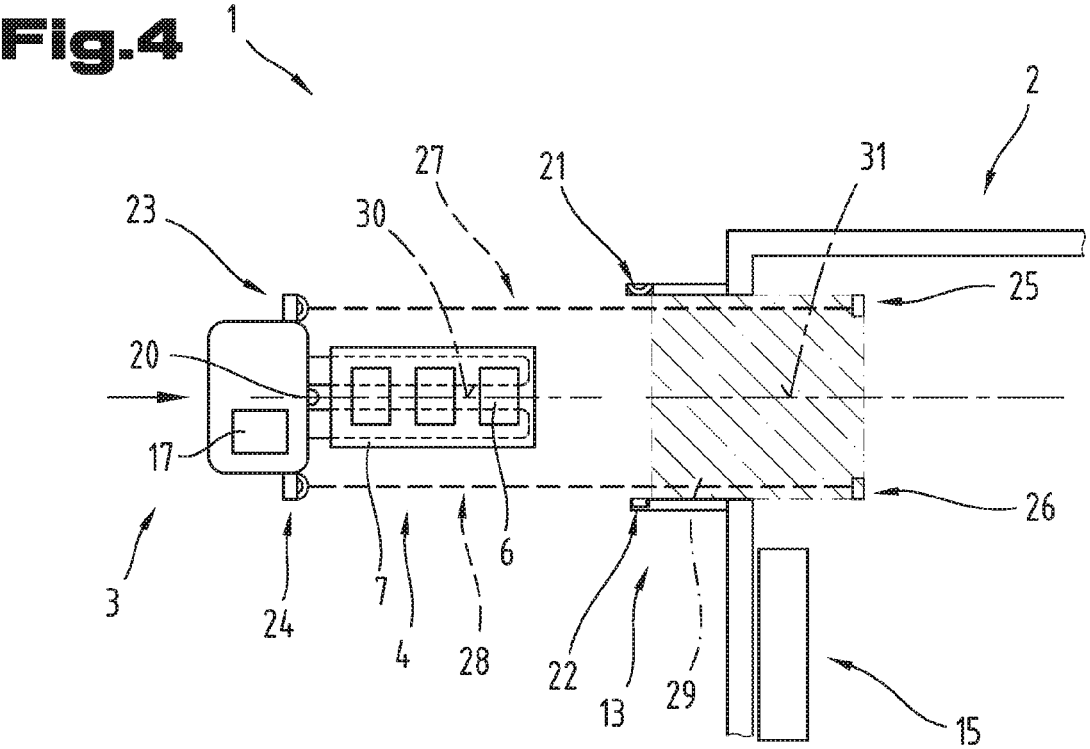
FIG. 4 the conveying means in front of the lock of the manufacturing cell with activated lateral light barrier arrangements.

According to the invention, the manufacturing device 1 is and/or the lock 13 of the manufacturing cell 2 and the conveying means 3 are formed having further transmitters 23, 24 and/or receivers 25, 26 for temporarily forming light barrier arrangements 27, 28 (FIG. 4).

FIG. 3 shows the conveying means 3 in a starting position for the loading operation of the pallet 7 with the workpieces 6 into a parking zone 29 of the lock 13. In this regard, the direction of entry 30 of the load receiving means 4 and a direction of passage 31 of the lock 13 are aligned with one another. Accordingly, the transmitter 23 and the receiver 25 of the second light barrier arrangement 27 on the one hand and the transmitter 24 and the receiver 26 of the third light barrier arrangement 28 on the other hand are positioned and/or arranged at the conveying means 3 and/or in the lock 13. This means that the two transmitters 23, 24 of the conveying means 3 are arranged on the same laterally with respect to the direction of entry 30 of the load receiving means 4. Apart from that, the two receivers 25, 26 of the lock 13 are also arranged laterally with respect to the direction of entry 30, so that, in an enabled and/or activated state of the two light barrier arrangements 27, 28, they laterally bound the load receiving means 4 with the workpieces 6 and/or with the pallet 7. It is preferably provided that the two light barrier arrangements 27, 28 are oriented essentially in parallel to one another.

Figure 5:
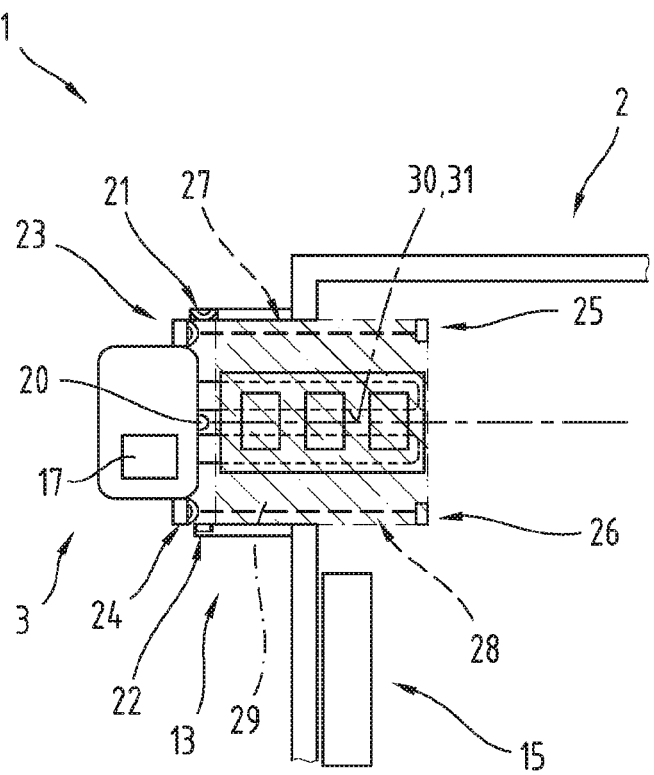
FIG. 5 the manufacturing cell with the conveying means moved into the lock.
Figure 6:
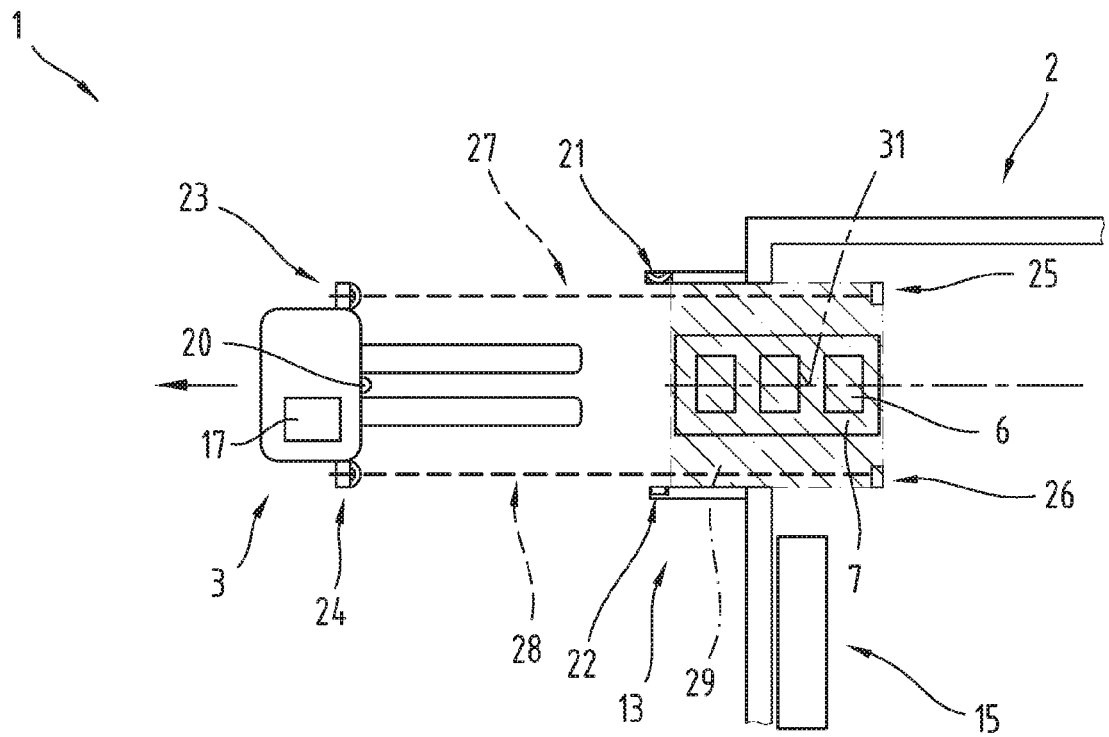
FIG. 6 the conveying means in front of the lock of the manufacturing cell after parking the pallet and/or the workpieces in the parking zone of the lock.

In an activated state of the two light barrier arrangements 27, 28, they form a U-shaped lateral boundary together with the conveying means 3. Thereby, a connected spatial region, the inside of which comprises both the parking zone 29 of the lock 13 and the load receiving means 4 of the conveying means 3, is secured and/or enclosed to the side (FIGS. 4, 5, 6). The two lateral light barrier arrangements 27, 28 thus serve as a temporarily usable safety device.

After the conveying means 3 has assumed its starting position in front of the lock 13 of the manufacturing cell 2 (according to FIG. 3) for carrying out the loading operation, which can be detected by an integrated device for determining the location of the controller 17 of the conveying means 3, the two light barrier arrangements 27, 28 are activated by the controller 17. For this purpose, the two transmitters 23, 24 are switched on so that light beams fall onto the respective receivers 25, 26 and are detected by them. The activation of the two light barrier arrangements 27, 28 can consequently be registered by the controller 15 of the lock 13, whereupon the first light barrier arrangement 14 in front of the lock 13 can be switched off by the controller 15 of the lock 13 (FIGS. 3, 4). This corresponds to a transfer and/or a change of the securing function from the first light barrier arrangement 14 in front of the lock 13 to the two lateral light barrier arrangements 27, 28. This simultaneously means an expansion of the spatial region to be secured up to the joint region of parking zone 29 of the lock 13 and load receiving means 4 of the conveying means 3. In the further course of the loading operation, the lateral light barrier arrangements 27, 28 then serve to observe and/or to secure the expanded, joint region (load receiving means 4 and parking zone 29).

The subsequent phase of the loading operation—after activation of the light barrier arrangement 27, 28—consists in that the conveying means 3 enters into the lock 13 with its load receiving means 4 (FIG. 5). By lowering the forks 5 of the load receiving means 4, the conveying means 3 can then set the pallet 7 with the workpieces 6 down in the parking zone 29 and subsequently move out of the lock 13 (FIG. 6).

Figure 7:
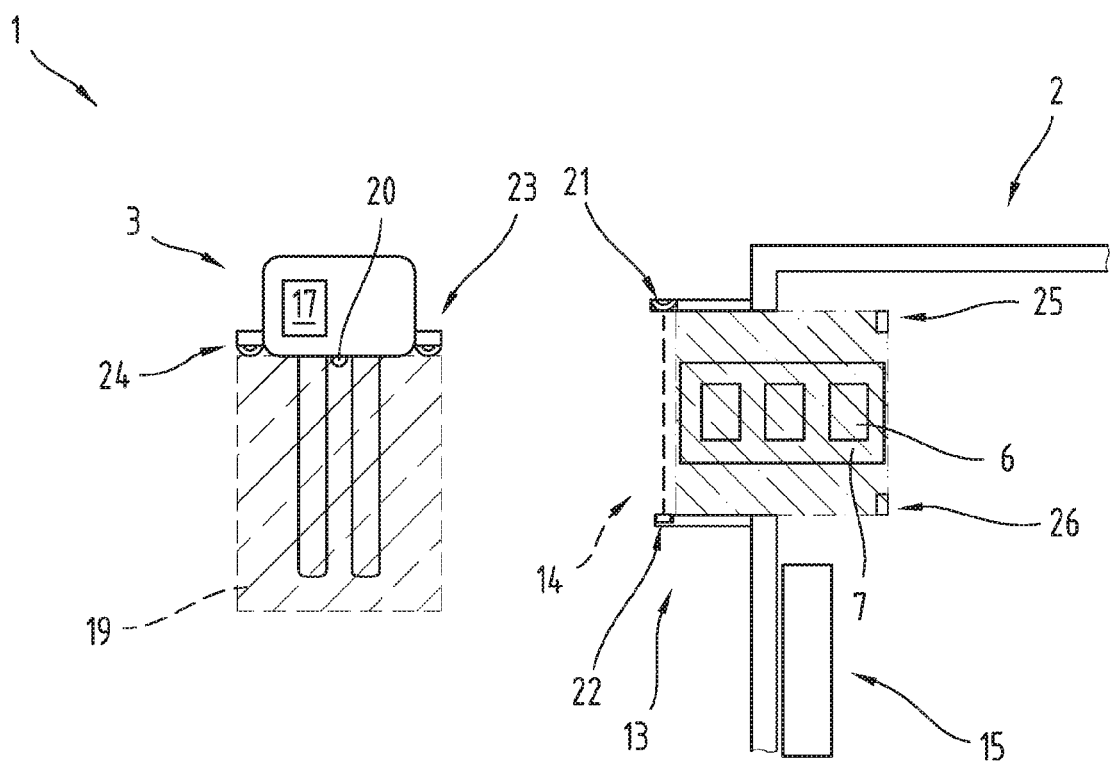
FIG. 7 the manufacturing device with the conveying means departing from the manufacturing cell.

As soon as the conveying means 3 has reached its original starting position in front of the lock 13 again, the two light barrier arrangements 27, 28 are deactivated and/or shut off again by the controller 17 of the conveying means 3 (FIGS. 6, 7). This can be registered by the controller 15 of the lock 13 by means of the two receivers 25, 26 of the lock 13 due to the lack of signals, whereupon the controller 15 enables the first light barrier arrangement 14 in front of the lock 13.

For the loading operation described, it is additionally provided that, when the conveying means 3 has reached its starting position in front of the lock 13 and has stopped there, the scanner and/or detector 20 for the observation region 19 of the conveying means 3 is deactivated (FIGS. 3, 4). On the other hand, the detector 20 is switched on again and the observation region 19 is reactivated (FIG. 7) after completion of the loading operation, before the conveying means 3 leaves the starting position in front of the lock 13 (FIG. 6).

During the duration, in which the securing function is carried out by the two lateral light barrier arrangements 27, 28 (FIGS. 4, 5, 6), the two controllers 15, 17 of the lock 13 and/or of the conveying means 3 interpret interruptions of the light beams of the two light barrier arrangements 27, 28 as an object or a person intruding and/or crossing the respective borders, and corresponding securing measures are initiated. This includes, for example, that a conveying means 3 is automatically stopped by the controller 17. On the other hand, in such a case, the first light barrier arrangement 14 in front of the lock 13 can be reactivated by the controller 15 of the lock 13 (by switching on the first transmitter 21 and the first receiver 22).

For such a case of an object or a person intruding the region observed by the two light barrier arrangements 27, 28, it is preferably also provided that, after detecting such an interruption of one of the light barrier arrangements 27, 28, the observation region 19 of the conveying means 3 is reactivated by switching on the detector 20. The interrupted loading operation can subsequently be resumed by the controller 15 of the manufacturing cell 2, only once, based on the signals and/or data received by the detector 20 of the observation region 19 of the conveying means 3, it can be determined that the observation region 19 is free of obstacles again. The measures required therefor may be carried out in an automatic manner with participation of the controller 17 of the conveying means 3 and the controller 15 of the lock 13.

Figure 8:
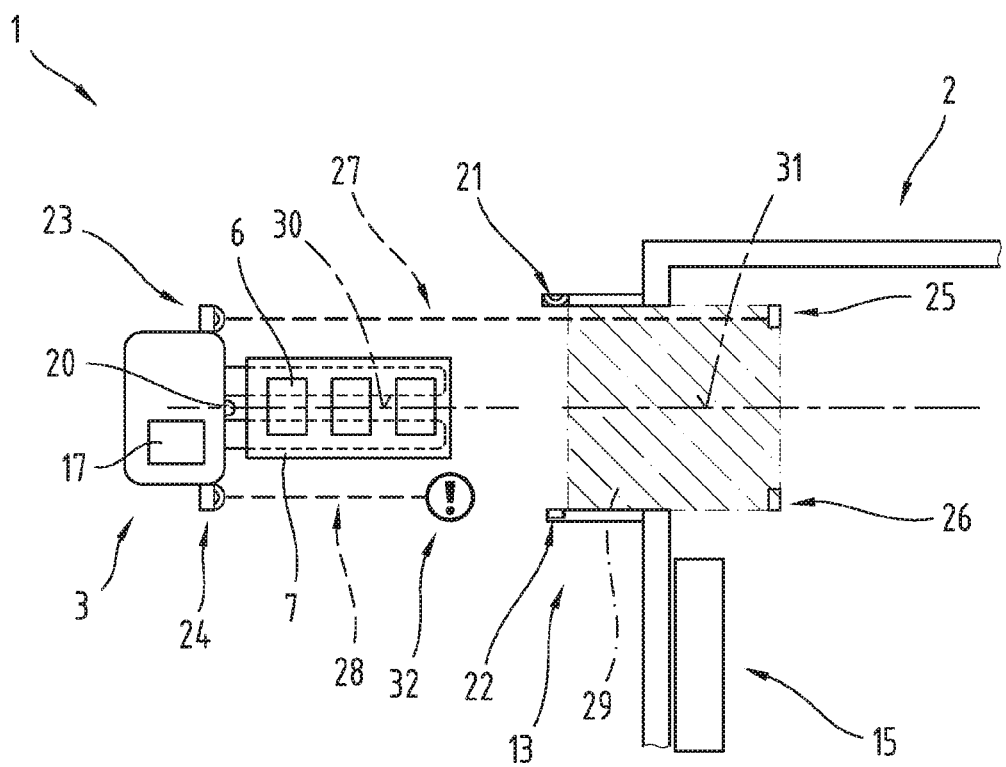
FIG. 8 the conveying means in front of the lock of the manufacturing cell in the situation of a failure of the loading operation.

FIG. 8 shows the situation of an interruption of a loading operation of the conveying means 3 at the lock 13 of the manufacturing cell 2. According to the representation, the lateral light barrier arrangement 28 is interrupted by a person 32 here, by their body covering the light beam emitted by the transmitter 24. The receiver 26 of the light barrier arrangement 28 can therefore not detect the light beam, which can be registered by the controller 15 of the lock 13 as a fault occurring.

The controller 15 of the lock 13 can then generate a report and/or message, which is transmitted to the central controller 18 of the manufacturing device via the controller 16 of the manufacturing cell 2. The controller 17 of the conveying means 3 then receives a notification on the interruption of the lateral light barrier arrangement 28 from the central controller 18 of the manufacturing device 1, and the conveying means 3 is stopped in response. Preferably, as a further response to the notification on the interruption of the light barrier arrangement 28, the detector 20 for the observation region 19 of the conveying means 3 is switched on. The travel movement of the conveying means 3 is resumed by its controller 17 only once the observation of the observation region 19 by the detector 20 has found that the person 32 is no longer in the observation region 19 of the conveying means 3. The resumption of the travel movement of the conveying means 3 moreover presupposes that the corresponding light beams emitted by the transmitters 23, 24 of the conveying means 3 are received again by the receivers 25, 26 of the lock 13 (corresponds to the situation as shown in FIG. 4).

Figure 9:
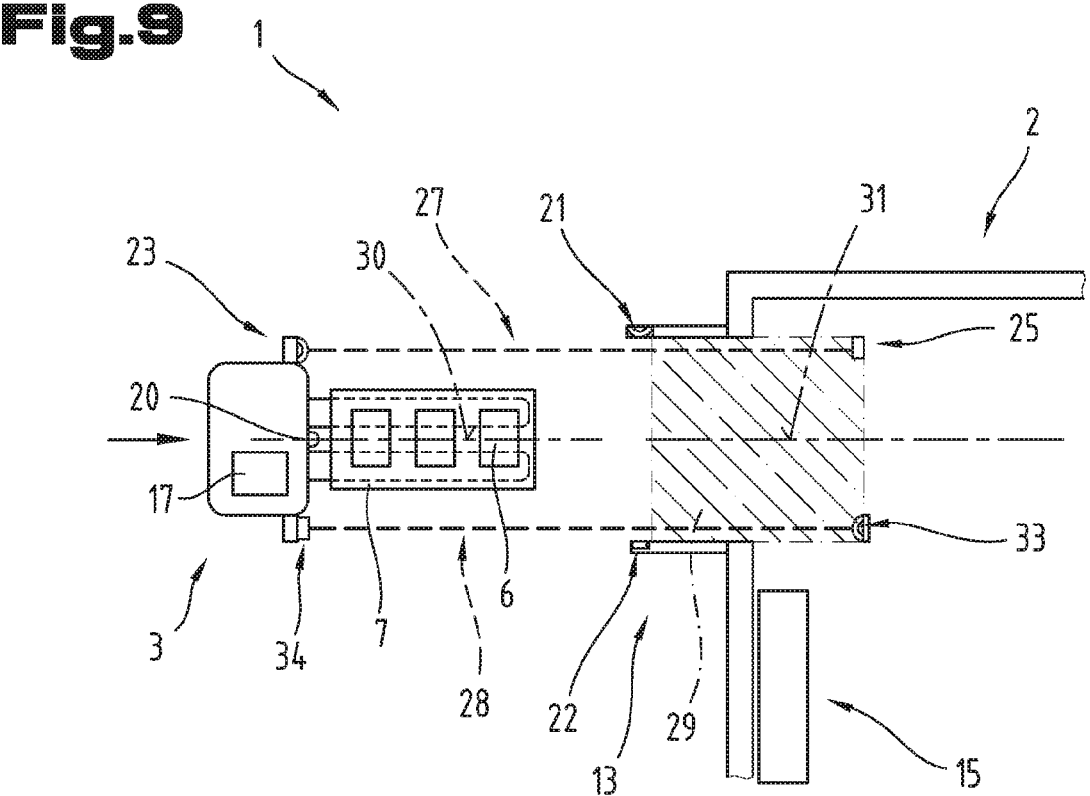
FIG. 9 a detail of an alternative embodiment of the manufacturing device with the conveying means at the start of a loading operation.

FIG. 9 shows a detail of an alternative embodiment of the manufacturing device 1. Again, equal reference numbers and/or component designations are used for equal parts as in FIGS. 1 to 8 preceding it. In order to avoid unnecessary repetitions, it is pointed to/reference is made to the detailed description in the figures preceding it.

In the manufacturing device 1 according to this exemplary embodiment, the two lateral light barrier arrangements 27, 28 formed between the conveying means 3 and the manufacturing cell 2 are realized by an alternative arrangement of transmitters and receivers.

The left light barrier arrangement 27 (to the left in a viewing direction from the conveying means 3 onto the lock 13 of the manufacturing cell 2) is formed by the transmitter 23 on the conveying means 3 and the receiver 25 on the lock 13, just as in the exemplary embodiment according to FIGS. 2 to 8. To form the right light barrier arrangement 28, a transmitter 33 is provided on the lock 13 and a receiver 34 is provided on the conveying means 3. The conveying means 3 accordingly has the transmitter 23 on the left and the receiver 34 on the right. While the controller 15 of the lock 13 is connected to the receiver 25 arranged on the left and the transmitter 33 arranged on the right.

According to this embodiment variant, it is additionally provided for the manufacturing device 1 that the two lateral light barrier arrangements 27, 28 may also be used for the direct transmission of messages between the conveying means 3 and the lock 13. For this purpose, the controller 17 of the conveying means 3 and/or the transmitter 23 are designed so that an encoded signal may be modulated on to the light beam of the left light barrier arrangement 27, which signal, on the other hand, can be received and decoded by the receiver 25 and/or the controller 15 of the lock 13. Analogously to this, the controller 15 of the lock 13 having the transmitter 33 is also designed to transmit a notification to the receiver 34 and/or the controller 17 of the conveying means 3 via the light beam of the right light barrier arrangement 28. This way, a direct communication between the conveying means 3 and the lock 13 of the manufacturing cell 2 is possible without an exchange of messages with the superordinate controller 16 of the manufacturing cell 2 or with the central controller 18 of the entire manufacturing device 1 having to take place for this purpose.

The method for delivering workpieces 6 to the manufacturing cell 2 with the aid of the conveying means 3 according to this embodiment variant allows checking operating states based on additional criteria, wherein this may take place in direct communication between the conveying means 3 and the lock 13 of the manufacturing cell 2. In its basic state, the controller 15 of the lock 13 will keep its light barrier arrangement 14 activated and that way, observe the access to the lock 13. Beyond that, the controller 15 only has to observe the state of the receiver 25, so that, in case of a conveying means 3 arriving between the receiver 25 and the lock 13 of the manufacturing cell 2, a communication may occur.

A conveying means 3 arriving at the lock 13 of the manufacturing cell 2 for delivering workpieces 6 will first assume a starting position in front of the lock 13 for the loading operation, in which starting position the direction of entry 30 of the load receiving means 4 and/or of the conveying means 3 is aligned with the direction of passage 31 of the lock 13. As soon as the conveying means 3 has assumed said starting position for the loading operation, the controller 17 of the conveying means 3 will switch on the light barrier arrangement 27 by activating the transmitter 23 of the light barrier arrangement 27 arranged on the left side and thereby—and by detecting the light beam by means of the receiver 25—establish a connection to the lock 13 and/or its controller 15. In response to this, the controller 15 of the lock 13 can activate the right light barrier arrangement 28 by activating the transmitter 33, by means of which a light beam is in turn focused on the receiver 34 on the conveying means 3. The detection of the light beam on the receiver 34 of the conveying means 3 ultimately gives its controller 17 the information that the loading operation can now actually be carried out. This two-sided detection of the readiness for the loading operation is also a prerequisite for the controller 15 of the lock 13 to be able to deactivate the light barrier arrangement 14 and, on the other hand, for the controller 17 of the conveying means 3 to be able to deactivate the detector 20 for the observation region 19. Ultimately, the conveying means 3 is put into motion by the controller 17 in order to enter the lock 13.

During the further course of the loading operation, the observation of the expanded connected spatial region is carried out by the two lateral light barrier arrangements 27, 28, which spatial region includes both the load receiving means 4 with the fork 5 and the pallet 7 with the workpieces 6 and the parking zone 29 in the lock 13. An interruption of one of the two light beams of the lateral light barrier arrangements 27, 28 is recognized by the controllers 15, 17 of the conveying means 3 and the lock 13 as the occurrence of a failure, and emergency measures can be initiated by the two controllers 15, 17 in direct communication with one another.

Figure 10:
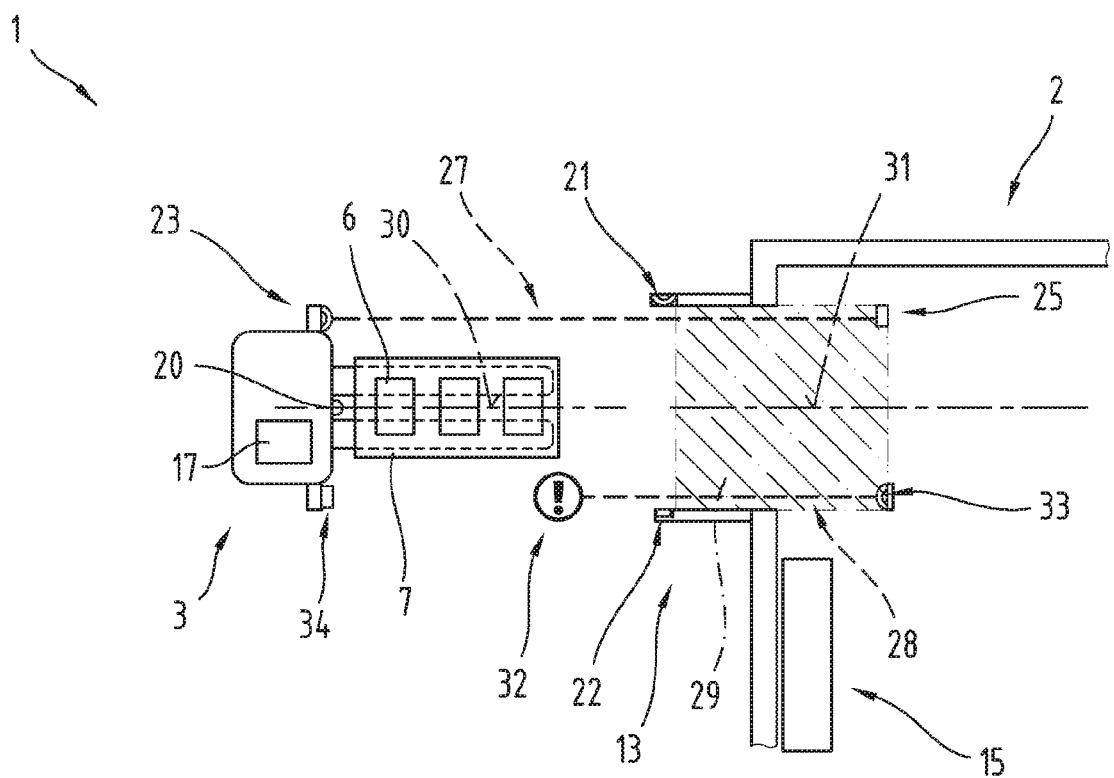
FIG. 10 the manufacturing device according to FIG. 9 in the situation of a failure of the loading operation.

FIG. 10 shows a situation of a failure and/or interruption of the loading operation of the conveying means 3 at the lock 13 of the manufacturing cell 2. In the situation shown, the body of a person 32 has approached the expanded observation region so closely that the light beam of the right light beam arrangement 28, between the transmitter 33 of the lock 13 and the receiver 34 of the conveying means 3, is interrupted. Thus, an absence of a signal is registered by the controller 17 of the conveying means 3 by means of the receiver 34, and the conveying means 3 is stopped. At the same time, the controller 17 can generate a corresponding report, which is transmitted to the controller 15 of the lock 13 via the left light barrier arrangement 27. As a further protection measure, apart from stopping the conveying means 3, the controller 15 of the lock 13 can switch the light barrier arrangement 14 in front of the lock 13 back on, and the controller 17 of the conveying means 3 can switch on the detector 20 for activating the observation region 19.

Furthermore, the resumption and/or continuation of the loading operation after such a failure may also take place in an automated manner. If the controller 17 of the conveying means 3 detects that the person 32 and/or any other disruptive object is no longer within the observation region 19, this fact can also be communicated to the controller 15 of the lock 13. In further consequence, the conveying means 3 can be activated again and thus, the loading operation can be resumed—after deactivation of the detector 20 of the conveying means 3 and switching the light barrier arrangement 14 in front of the lock 13 back off.

As a securing measure handled particularly strictly, it is particularly provided that for the entire duration, i.e. from the occurrence of the fault until the detection that no disruptive object or no disruptive person is present anymore, an observation of the observation region 19 as well as an observation of the access to the lock 13 is carried out by the detector 20 and the light barrier arrangement 14, respectively. Only then, an automatically controlled restart of the loading operation can be performed.

If then—after parking the pallet 7 with the workpieces 6—the conveying means 3 is moved back out of the parking zone 29 and/or back out of the lock 13, the controller 15 of the lock 13 is informed about this by the controller 17 of the conveying means 3. The controllers 15, 17 of the lock 13 on the one hand and of the conveying means 3 on the other hand can therefore identify the end of the loading operation. Subsequently, the two lateral light barrier arrangements 27, 28 can be deactivated, the light barrier arrangement 14 in front of the lock 13 can be activated and also the detector 20 of the conveying means 3 can be switched on again.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

1 Manufacturing device
2 Manufacturing cell
3 Conveying means
4 Load receiving means
5 Fork
6 Workpiece
7 Pallet
8 Safety partition
9 Processing device
10 Handling device
11 Safety device
12 Door
13 Lock
14 Light barrier arrangement
15 Controller
16 Controller
17 Controller
18 Controller
19 Observation region
20 Detector
21 Transmitter
22 Receiver
23 Transmitter
24 Transmitter
25 Receiver
26 Receiver
27 Light barrier arrangement
28 Light barrier arrangement
29 Parking zone
30 Direction of entry
31 Direction of passage
32 Person
33 Transmitter
34 Receiver

The invention claimed is:

1. A manufacturing device having a manufacturing cell for processing workpieces, with a laterally circumferential safety partition forming a boundary of the manufacturing cell,
   wherein a lock is formed in the safety partition for performing a loading operation of the workpieces, and
   wherein a first light barrier arrangement with a first transmitter and with a first receiver assigned to the first transmitter is formed at an opening of the lock, and with a driverless conveying means with a load receiving means for conveying the workpieces,
   wherein for performing the loading operation, a second light barrier arrangement and a third light barrier arrangement are formed between the conveying means and the lock, so that the load receiving means and the workpieces are laterally bounded on opposite sides by the second light barrier arrangement and by the third light barrier arrangement, and
   wherein the second light barrier arrangement comprises a second transmitter, which is fastened to the conveying means, and a second receiver, which is fastened to the lock, and
   wherein the third light barrier arrangement comprises a third transmitter, which is fastened to the lock, and a third receiver, which is fastened to the conveying means; and
   wherein the lock comprises a lock controller, wherein the lock controller is designed to activate the first light barrier arrangement in front of the lock in a program-controlled manner if the lock controller registers an interruption of the second light barrier arrangement or the third light barrier arrangement.

2. The manufacturing device according to claim 1, wherein during the execution of the loading operation, a region connected to a parking zone of the lock for the workpieces is laterally bounded by the conveying means, by the second light barrier arrangement and by the third light barrier arrangement.

3. The manufacturing device according to claim 1, wherein the conveying means comprises a conveying means controller, wherein the conveying means controller is designed to activate and to deactivate the second light barrier arrangement and/or the third light barrier arrangement as needed in a program-controlled manner.

4. The manufacturing device according to claim 3, wherein the conveying means controller of the conveying means and the lock controller of the lock are designed to jointly observe the second light barrier arrangement and the third light barrier arrangement in a program-controlled manner.

5. The manufacturing device according to claim 3, wherein the second light barrier arrangement is designed to transmit a message from the conveying means controller of the conveying means to the lock controller of the lock, and wherein the third light barrier arrangement is designed to transmit a message from the lock controller of the lock to the conveying means controller of the conveying means.

6. The manufacturing device according to claim 1, wherein the conveying means comprises a detector for forming an observation region, wherein the observation region extends beyond a joint spatial extension of the load receiving means and the workpieces in the lateral direction.

7. A method for loading workpieces with a driverless conveying means and a manufacturing cell for processing the workpieces, wherein a lock is formed in a laterally circumferential safety partition of the manufacturing cell, and wherein an opening of the lock is secured against unauthorized access by means of a first light barrier arrangement with a first transmitter and with a first receiver assigned to the first transmitter, and wherein the driverless conveying means comprises a load receiving means and is controlled by a conveying means controller, wherein
the driverless conveying means is moved to a starting position for the loading operation in front of the lock of the manufacturing cell; and
a second light barrier arrangement and a third light barrier arrangement are activated by the conveying means controller of the conveying means, wherein the load receiving means and the workpieces are laterally bounded on opposite sides by the second light barrier arrangement and by the third light barrier arrangement, and wherein the second light barrier arrangement comprises a second transmitter, which is fastened to the conveying means, and a second receiver, which is fastened to the lock, and wherein the third light barrier arrangement comprises a third transmitter, which is fastened to the lock, and a third receiver, which is fastened to the conveying means; and
the first light barrier arrangement is deactivated by a lock controller of the lock; and
the second light barrier arrangement and the third light barrier arrangement are observed by the conveying means controller of the conveying means and by the lock controller of the lock during the execution of the loading operation; and
if the lock controller of the lock registers an interruption of the second light barrier arrangement or the third light barrier arrangement, the first light barrier arrangement is activated.

8. The method according to claim 7, wherein in the starting position, a direction of entry of the conveying means is oriented so as to be aligned with a direction of passage of the lock.

9. The method according to claim 7, wherein, if the conveying means controller of the conveying means registers an interruption of the second light barrier arrangement or the third light barrier arrangement, the conveying means is stopped.

10. The method according to claim 7, wherein, if the conveying means controller of the conveying means registers an interruption of the second light barrier arrangement or the third light barrier arrangement, a detector of the conveying means is activated, wherein the detector forms an observation region extending beyond a joint spatial extension of the load receiving means and the workpieces in the lateral direction.

11. The method according to claim 7, wherein the second light barrier arrangement and/or the third light barrier arrangement are used by the conveying means controller of the conveying means and by the lock controller of the lock for directly transmitting messages between the conveying means and the lock.

* * * * *